United States Patent [19]

Madura

[11] Patent Number: 5,028,067
[45] Date of Patent: Jul. 2, 1991

[54] AUTOMATIC FIFTH WHEEL SAFETY LOCK DEVICE

[75] Inventor: Francis E. Madura, Whiting, Ind.

[73] Assignee: AMSTED Industries Incorporated, Chicago, Ill.

[21] Appl. No.: 509,348

[22] Filed: Apr. 16, 1990

[51] Int. Cl.⁵ ............................................. B62D 53/06
[52] U.S. Cl. ...................................... 280/433; 280/434; 280/437
[58] Field of Search ........................ 280/433, 434, 437

[56] References Cited

U.S. PATENT DOCUMENTS

| | | | |
|---|---|---|---|
| 2,471,854 | 5/1949 | Bies et al. | 280/433 |
| 3,056,612 | 10/1962 | Slaven | 280/434 |
| 4,871,182 | 10/1989 | Altherr et al. | 280/434 |

FOREIGN PATENT DOCUMENTS

| | | | |
|---|---|---|---|
| 2233506 | 3/1973 | Fed. Rep. of Germany | 280/433 |
| 0839821 | 6/1981 | U.S.S.R. | 280/433 |

Primary Examiner—Charles A. Marmor
Assistant Examiner—Michael Shaughnessy
Attorney, Agent, or Firm—Edward J. Brosius; Florian S. Gregorczyk

[57] ABSTRACT

An automatic fifth wheel having a power operated jaw unlocking mechanism for non-highway use and a manual safety lock operative to immobilize the automatic unlocking mechanism so as to also enable safe over the road operation.

2 Claims, 4 Drawing Sheets

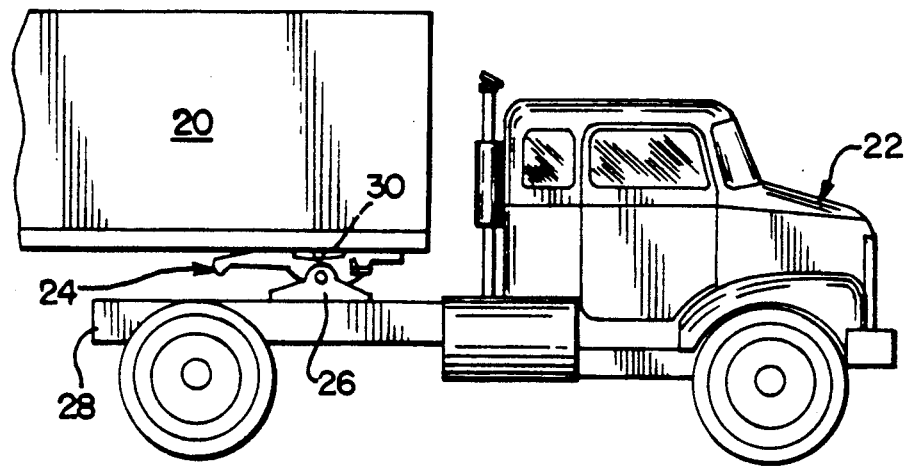
FIG_1_
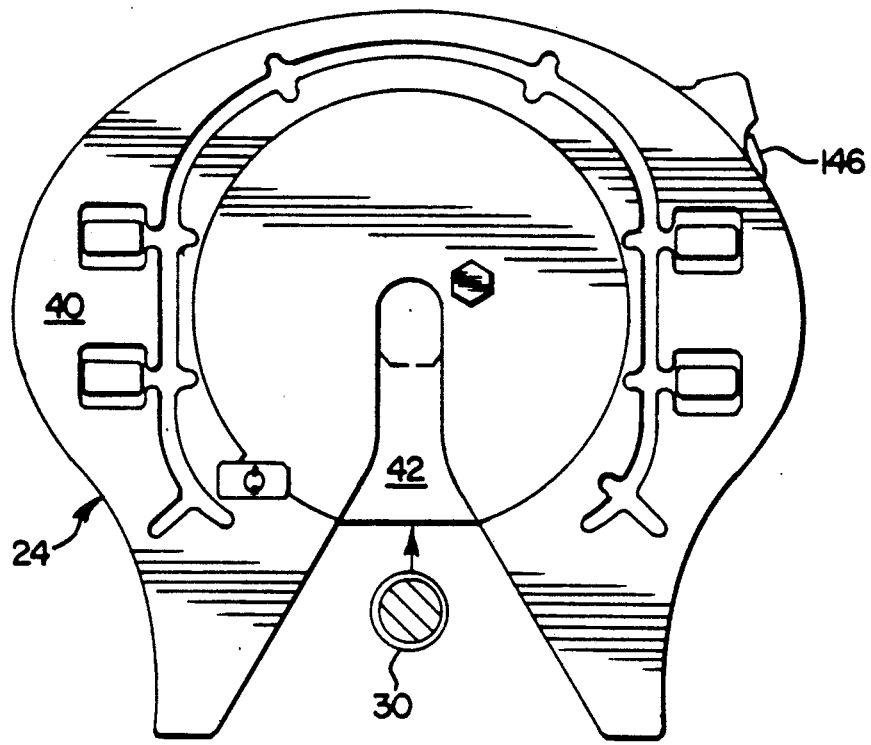
FIG_2_

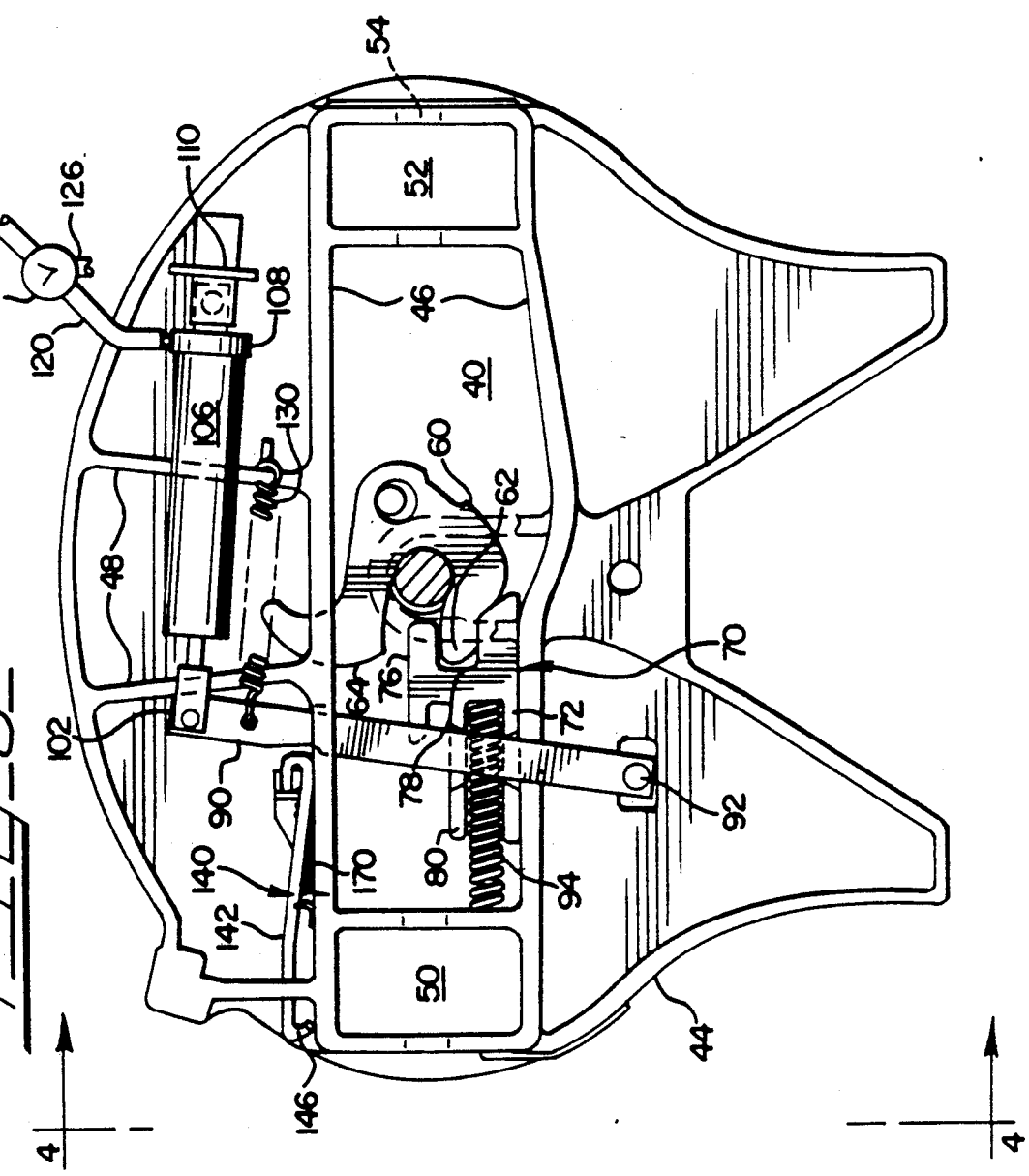

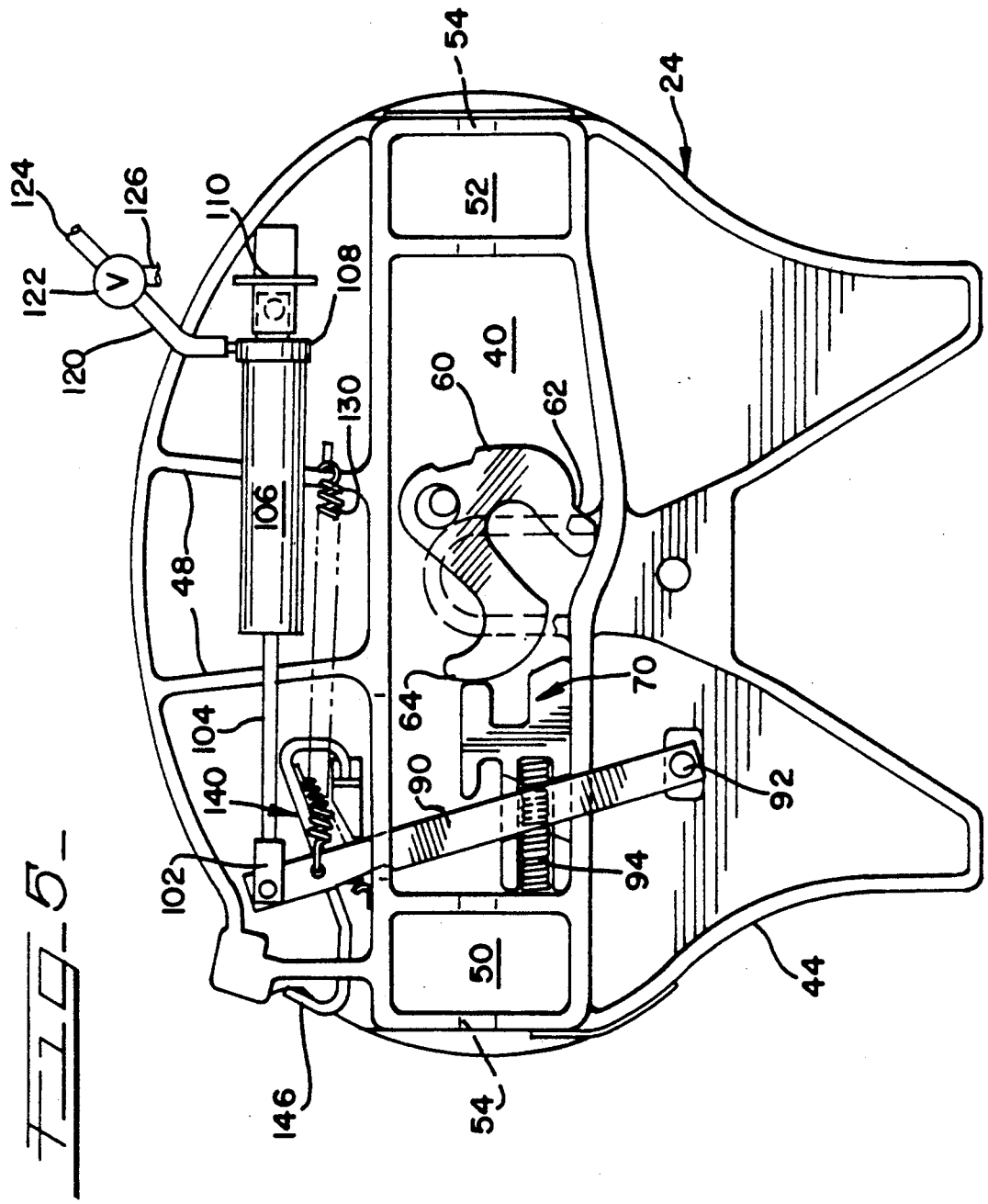

AUTOMATIC FIFTH WHEEL SAFETY LOCK DEVICE

The present invention relates to automatic fifth wheels for tractors by which trailers are demountably connected to the tractors, and more particularly to an improved apparatus for locking the connection to a trailer

BACKGROUND OF THE INVENTION

Fifth wheel devices include a plate which supports the forward bed plate of a trailer. A king pin is fixed to the trailer bed plate and extends into a center opening of the fifth wheel plate. Fifth wheels have included a pivotally mounted jaw to engage and hold the king pin. Usually the king pin includes a reduced diameter neck and an enlarged end and the fifth wheel jaw surrounds the neck of the king pin so as to prevent it being disengaged either vertically or horizontally. Normally the jaw closes and is secured on the king pin as the tractor and trailer are brought together. For over the road tractors there is also a fail-safe jaw unlocking and locking mechanism including a manually operated rod and latch, such as that shown in my U.S. Pat. No. 4,871,182, purposely located at the side of the fifth wheel where it can be reached only while the tractor is not in motion. However, there is an automatic unlocking system available on certain fifth wheels that are intended for non-highway use, such as in freight terminals, where operation is at low speeds and disengagement of the trailer king pin is, while undesirable, not as dangerous as at highway speeds and the ability to rapidly unlock and release a trailer is highly advantageous.

Such an automatic system has been employed on yard-captive tractors that are essentially dedicated to non-highway use; however, occasionally a yard-captive tractor has been utilized for over the highway hauling. The automatic system heretofore in use has simply substituted a powered reciprocal element, such as pneumatic cylinder, for the rod and latch and the powered element is controlled from the cab of the yard-captive tractor. Thus an operator of the tractor has been able to activate the unlocking system and permit the jaw to open to release a trailer king pin by simply moving a switch in the tractor cab. While advantageous for shifting trailers within a confined terminal, such an automatic system has not heretofore been sufficiently safe and fail proof for highway operation.

SUMMARY OF THE PRESENT INVENTION

Accordingly, it is a principal object of the present invention to provide a fifth wheel suitable for both over the road and off-highway operation.

It is another object of the present invention to provide a fifth wheel with a safety lock device on an automatic unlocking system.

It is a further object of the present invention to provide an automatic unlocking system on a fifth wheel with a manual safety lock that overcomes the automatic unlocking system.

It is still another object of the present invention to provide an improved fifth wheel automatic unlocking device that is secureable against unintended release of a king pin engaging jaw.

The present invention utilizes a safety lever manually operable from one side of a fifth wheel which lever is movable between a neutral position and a blocking position that immobilizes movement of the fifth wheel unlocking mechanism and thereby prevents automatic operation of the unlocking mechanism.

BRIEF DESCRIPTION OF THE DRAWINGS

Further objects and advantages of the invention will become apparent from the following detailed description taken in conjunction with the drawings wherein:

FIG. 1 is a side view of a tractor and trailer with a fifth wheel mounting;

FIG. 2 is a plan view of a fifth wheel;

FIG. 3 is a bottom view of a fifth wheel incorporating the present invention with a jaw in a secured position and safety lever in blocking position;

FIG. 4 is a side view of the fifth wheel of FIG. 3;

FIG. 5 is a bottom view of the fifth wheel of FIG. 3 in an unlocked and jaw open position;

DETAILED DESCRIPTION

Figure 7:
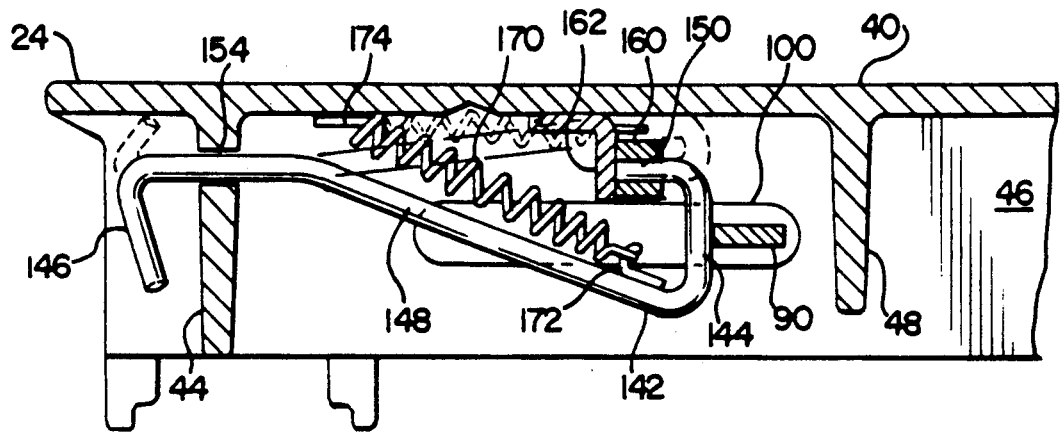
FIG. 7 is a partial elevation view in section taken at line 7—7 of FIG. 6.

Referring to the drawings, FIG. 1 generally illustrates an over the road trailer 20 and yard-captive tractor 22 having a fifth wheel generally 24, pivotally mounted on brackets 26 fastened to the tractor frame 28, which receives and engages a king pin plate of the trailer 20.

In FIG. 2 the fifth wheel, generally 24, is shown to comprise a trailer support plate 40 having an open "V" slot 42 to receive (and release) a trailer king pin 30. The periphery of the plate 40 is in the form of a depending skirt 44 (best seen in FIG. 4); and as may be seen in FIG. 3 the underside of the plate 40 has a pair of lateral strengthening webs 46 and additional webs 48 to provide rigidity.

Preferably the fifth wheel plate 40, skirt 44 and webs 46, 48 are integrally cast from steel. The webs and skirt are arranged to form pockets 50, 52 (at opposite sides of the plate 40 aligned with the king pin opening at the end of slot 42) to rockingly rest upon the mounting brackets 26; and holes 54 are provided to receive pivot pins (not shown) which hold the fifth wheel 24 to the mounting brackets 26.

As shown in FIG. 3 a jaw generally 60 is pivotally mounted to the underside of plate 40 and positioned to swing across the apex of the "V" shaped pin slot 42. The jaw 60 is bifurcated into a detent portion 62 and a foot portion 64 with an opening therebetween. The jaw 60 is shown in a closed, secured and locked position in FIG. 3 whereby a reduced diameter neck portion of a king pin 30 would be engaged within the jaw opening at the apex of the pin slot 42 and thereby prevented from vertical or horizontal extraction. The jaw 60 will automatically assume a closed position shown in FIG. 3 when a trailer 20 is moved forwardly onto the fifth wheel 24 so as to advance a king pin 30 through the slot 42 and against the inner portion of jaw foot 64. In FIG. 5 the jaw 60 is shown in an open position ready to receive a king pin 30 within the opening between its foot 64 and detent 62 portions.

In FIGS. 3 and 5 a jaw securing mechanism generally 70 is also shown comprising a slidable bolt 72 held against the underside of the fifth wheel plate 40 by a cover guard (not shown). The bolt 72 is slidable inward-toward and outward-away from the jaw 60 and carries a clamp head 76 having an opening 78 to receive the jaw detent 62 and a release shoulder 80 spaced from the clamp head 76. A locking arm 90 extends through the space between clamp head 76 and release shoulder 80 from a pivot pin 92 by which it is pivotally secured to the underside of the fifth wheel plate 40. It will be seen that the bolt 72 (with clamp head 76 and shoulder 80) is biased to move inward toward the jaw 60 by a compression spring 94 mounted between a wall of one pocket 50 and the bolt clamp head 76; and movement of the locking arm 90 will cause the arm 90 to push against one of the opposing faces of the clamp head 76 or shoulder 80 to thereby, respectively, move the bolt 72 inward toward jaw 60 or outward away therefrom.

When a king pin 30 has been moved forward against jaw 60 to position the jaw as shown in FIG. 3 the jaw detent 62 will be aligned with opening 78 of clamp head 76 and the bolt 72 will, normally, be driven by spring 94 to capture and secure the detent 62 in the clamp head 76. In that condition the jaw is secured in a closed position against release of the king pin. If the bolt 72 is withdrawn by moving the free end of locking arm 90 outward to the left sufficiently to disengage detent 62 from the clamp head 76, the jaw 60 may pivot open to release the king pin 30 upon forces being applied to separate the tractor 22 and trailer 20. When the latter occurs (as shown in FIG. 5), the jaw will pivot so as to open and release the king pin 30 and simultaneously swing the jaw foot 64 against the withdrawn clamp head 76, thereby moving the bolt 72 and lever 90 slightly further outward and physically preventing inward return of the bolt 72 and clamp head 76 until another trailer king pin 30 is advanced unto the slot 42 so as to move the jaw 60 forward and thereby disengage the foot 64 from the clamp head 76 (a return to the positions illustrated in FIG. 3).

The foregoing description covers fifth wheel functional component parts that are prior art and have heretofore been known. The present invention is largely directed to the following operating system to manually restrict movement of the locking arm 90 and to thereby provide a safety lock.

As may be seen in FIG. 7, the locking arm 90 extends from pivot pin 92 through a slot 100 in web 46 and at its movable end is connected for automatic operation to a clevis 102 secured to the end of actuating rod 104 reciprocally extending from one end of a power cylinder 106. In turn the opposite end 108 of power cylinder 106 is pivotally held by a trunnion 110 secured, as by welding or the like, to the underside of support plate 40. In the illustrated embodiment the power cylinder 106 is pneumatic and for simplicity has a single hose 120 connected between the power cylinder end 108 and a three way valve 122 (shown schematically in FIG. 3) which in turn is connected to a pressurized air line 124 and an exhaust line 126. It will be apparent that the power cylinder 106 may be hydraulic, magnetic or otherwise. A tension spring 130 is also connected between the locking arm 90 and a web 48 so as to bias the arm 90 to move bolt 72 toward and lock the jaw 60 and also to force the actuating rod 104 into power cylinder 106.

Figure 6:
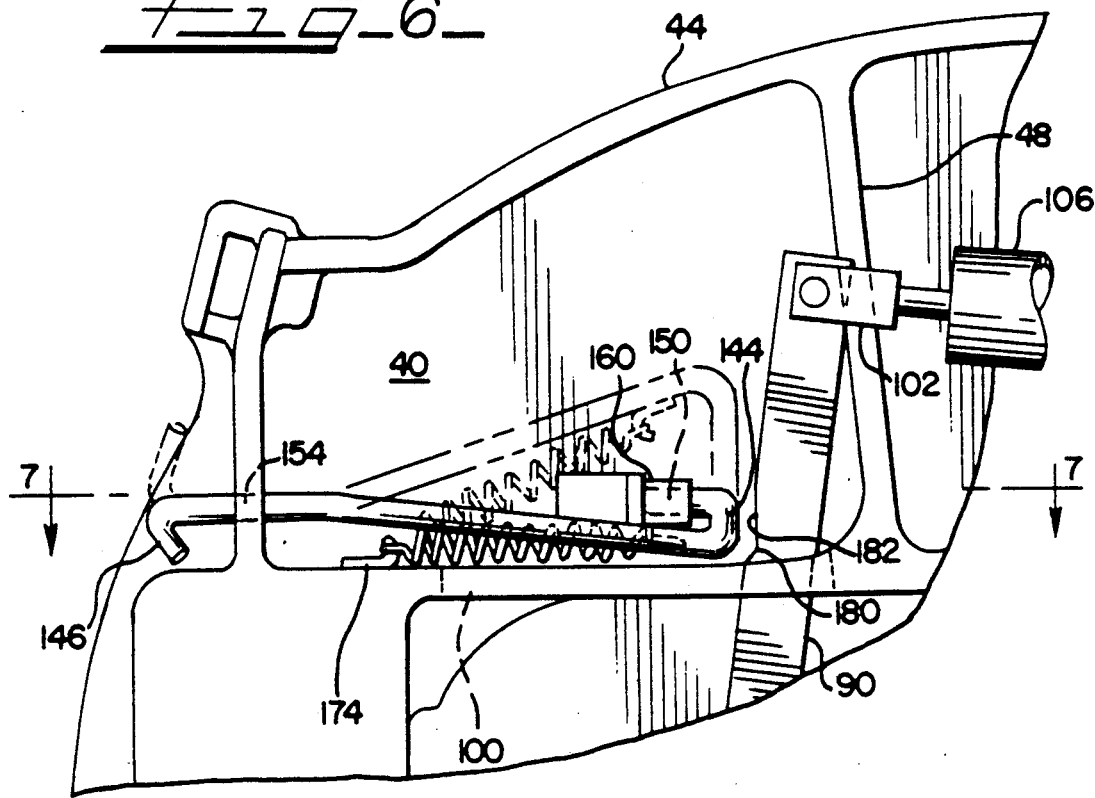
FIG. 6 is an enlarged detail view of a part of the apparatus of FIG. 3 showing the safety lever in a blocking position.

A safety lock generally 140 mechanically operable to prevent movement of locking arm 90 is best seen in FIGS. 3, 6 and 7. The safety lock 140 comprises a "S" shaped lever 142 having opposite arcuate segments 144, 146 interconnected by a central member 148. A first end 150 of one arcuate segment 144 is held in a pivot cup 160 and the second arcuate segment 146 extending through a hole 154 in the fifth wheel skirt 44 to provide an operating handle. In the embodiment illustrated the arcuate segments 144, 146 and central member 148 are in a single plane. The pivot cup 160 is fastened to a bracket 162 that is secured to either the underside of plate 40 (as shown) or to a web 46 so as to be spaced beneath the plate 40 and above the level of slot 100 and locking arm 90. A tension spring 170 is connected between a hook 172 fastened to S lever 142 and another hook 174 on web 46. The tension spring 170 will tend to bias and hold S lever 142 either in an upper neutral and inoperative position against plate 40 (shown in FIG. 5 and by phantom lines in FIGS. 6 and 7) with arcuate segment 144 nearly parallel thereto, or an operative blocking position against web 46 with arcuate segment 144 substantially perpendicular to plate 40 and lying across the locking arm 90. In the latter operative position (shown in FIG. 3 and by full lines in FIGS. 6 and 7) arcuate segment 144 of the S lever 142 will block movement of locking arm 90 so as to prevent bolt 72 from being withdrawn from jaw 60, and the handle arcuate segment 146 points downwardly as an indicator that the locking arm 90 is blocked and jaw 60 locked in a closed position. It is important that the configuration of the S lever 142 and its mounting above the locking arm assure it can assume and indicate a blocking position only when locking arm 90 is fully inward and jaw 60 closed. It is also important that untimely actuation of the power cylinder 106 not cause the locking arm 90 to move the S lever 142 to the inoperative, upper, position. That is accomplished in the present device by providing a notch 180 on the locking arm 90 with an engaging face 182 that is angled sufficiently to urge segment 144 and the S lever 142 toward the operative position against web 46.

When the aforedescribed fifth wheel is in use on a yard-captive tractor within a truck terminal (or otherwise off highway), the S lever 142 is manually moved to the upper inoperative position and movement of the locking arm 90, and hence bolt 72 and jaw 60, is fully controlled by valve 122 from the tractor cab. Accordingly, when an operator elects to disengage the tractor 22 from a trailer 20, with king pin 30 held by jaw 60 in the position shown in FIG. 3, he merely moves valve 122 to connect air pressure line 124 to hose 120 and the actuator rod 104 will be extended outwardly to move locking arm 90 so as to disengage bolt 72 and clamp head 76 from the jaw detent 62. At this time the forward end of trailer 20 should be supported on jacks, or the like, and the tractor is driven forward so as to relatively move king pin 30 and cause jaw 60 to pivot open whereupon the foot portion 64 will engage the clamp head 76 to prevent movement of the bolt 72 and locking arm 90. The jaw securing mechanism 70 is now ready to be returned to an engaged position by springs 94 and 130 upon the valve 122 being connected to exhaust 126 and jaw 60 being pivoted closed by action of another king pin when the tractor is manipulated to engage the fifth wheel 24 with another trailer 20.

The tractor 22 and fifth wheel 24 may thereafter be prepared for highway travel by twisting the handle of arcuate segment 146 to move S lever 142 to the operative blocking position after a trailer is engaged.

The foregoing details have been provided to describe a best mode of the invention and further variations and modifications may be made without departing from the spirit and scope of the invention which is defined in the following claims.

What is claimed is:

1. In an automatic fifth wheel apparatus having a pivotable jaw to engage a trailer king pin and a power operated unlocking mechanism engageable with said jaw to automatically secure and release said jaw, a locking arm pivotally mounted at one end to an underside of said fifth wheel, said locking arm being operatively connected to a bolt slidable to secure and release said jaw;

a pneumatic cylinder connected between said fifth wheel and an opposite end of said locking arm to swing said arm parallel to said fifth wheel between locked and unlocked positions;

and a safety lock mounted beneath said fifth wheel for movement between an operative position to block movement of said locking arm from said locked position and an inoperative position permitting said locking arm to be swung to and from said locked and unlocked positions, said safety lock comprising an S shaped lever having a first arcuate segment pivotally mounted from a pivot cup secured to the underside of said fifth wheel between said underside and said locking arm and a second arcuate segment extending as a handle beyond a side of said fifth wheel, said first and said second arcuate segments being joined by a central member whereby said first arcuate segment is pivotable between an inoperative position above said locking arm and an operative position across said locking arm.

2. The fifth wheel apparatus of claim 1 including a tension spring connected between said fifth wheel and said central member whereby to urge said safety lock toward each of said operative and inoperative positions.

* * * * *